(12) United States Patent
Kargilis

(10) Patent No.: US 8,973,208 B2
(45) Date of Patent: Mar. 10, 2015

(54) REAR WIPER SYSTEM

(71) Applicant: John S. Kargilis, Northville, MI (US)

(72) Inventor: John S. Kargilis, Northville, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/720,325

(22) Filed: Dec. 19, 2012

(65) Prior Publication Data

US 2013/0185888 A1 Jul. 25, 2013

Related U.S. Application Data

(63) Continuation-in-part of application No. 13/356,876, filed on Jan. 24, 2012.

(51) Int. Cl.
| B60S 1/46 | (2006.01) |
| B60S 1/08 | (2006.01) |
| B60S 1/50 | (2006.01) |
| B60S 1/52 | (2006.01) |
| B60S 1/58 | (2006.01) |
| B60S 1/04 | (2006.01) |
| B60S 1/34 | (2006.01) |

(52) U.S. Cl.
CPC .... *B60S 1/08* (2013.01); *B60S 1/50* (2013.01); *B60S 1/52* (2013.01); *B60S 1/583* (2013.01); *B60S 1/0438* (2013.01); *B60S 1/0491* (2013.01); *B60S 1/3411* (2013.01); *B60S 1/3465* (2013.01)
USPC .................... 15/250.01; 15/250.05; 15/250.3; 15/250.31

(58) Field of Classification Search
USPC ................ 15/250.3, 250.31, 250.05, 250.01; 239/284.1, 284.2; 307/10.1
See application file for complete search history.

(56) References Cited

U.S. PATENT DOCUMENTS

| 3,978,542 | A | * | 9/1976 | Van Eekelen et al. | ........ 15/250.3 |
| 4,310,943 | A | * | 1/1982 | Palma | ........ 15/250.01 |
| 5,079,793 | A | * | 1/1992 | Isii | ........ 15/250.19 |
| 5,570,923 | A | * | 11/1996 | Taylor | ........ 296/164 |
| 5,571,221 | A | * | 11/1996 | Kuo et al. | ........ 15/250.19 |
| 5,647,086 | A | * | 7/1997 | Gold | ........ 15/250.31 |
| 6,123,384 | A | * | 9/2000 | Eustache et al. | ........ 296/146.2 |
| 6,622,338 | B1 | * | 9/2003 | Chen et al. | ........ 15/250.19 |
| 7,290,306 | B2 | * | 11/2007 | Wagner | ........ 15/250.3 |
| 7,895,703 | B2 | * | 3/2011 | Ina et al. | ........ 15/250.3 |
| 8,020,247 | B2 | * | 9/2011 | Katou et al. | ........ 15/250.3 |
| 8,052,802 | B2 | * | 11/2011 | Binfet et al. | ........ 134/18 |
| 8,136,197 | B2 | * | 3/2012 | Peterson et al. | ........ 15/250.01 |
| 8,157,187 | B2 | * | 4/2012 | Shank et al. | ........ 239/13 |
| 2003/0222156 | A1 | * | 12/2003 | Bissonnette | ........ 239/284.1 |
| 2006/0112510 | A1 | * | 6/2006 | Egner-Walter | ........ 15/250.27 |
| 2009/0106927 | A1 | * | 4/2009 | Binfet et al. | ........ 15/250.12 |
| 2013/0042426 | A1 | * | 2/2013 | Webb et al. | ........ 15/250.17 |

\* cited by examiner

*Primary Examiner* — Monica Carter
*Assistant Examiner* — Michael Jennings
(74) *Attorney, Agent, or Firm* — Ralph E Smith

(57) ABSTRACT

A system for a vehicle may include a motor assembly, a wiper and a switch. The motor assembly may be mounted to a spare tire carrier on a tailgate of the vehicle and may include an output shaft that is rotatable relative to the spare tire carrier. The wiper may be attached to the output shaft for rotation with the output shaft relative to a rear window pane of the vehicle. The switch may be electrically connected to the motor assembly and may be operable to allow electrical current to reach the motor assembly when the wiper is in contact with the rear window pane. The switch may be operable to prevent electrical current from reaching the motor assembly in response to the wiper and the rear window pane being spaced apart from each other.

16 Claims, 8 Drawing Sheets

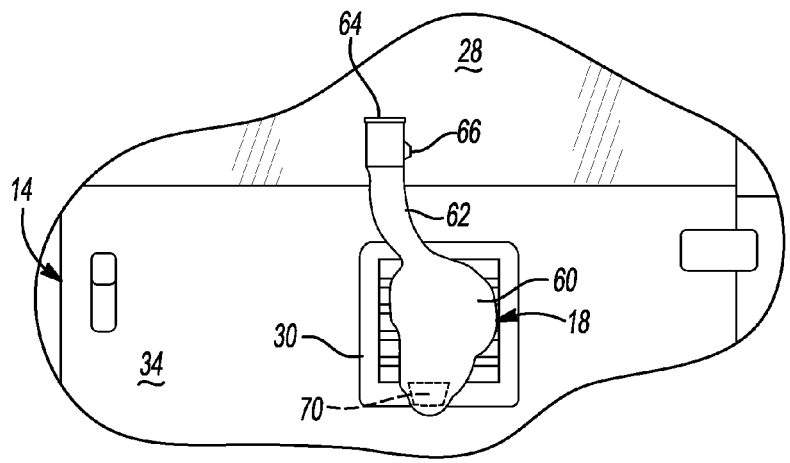
*Fig-4*
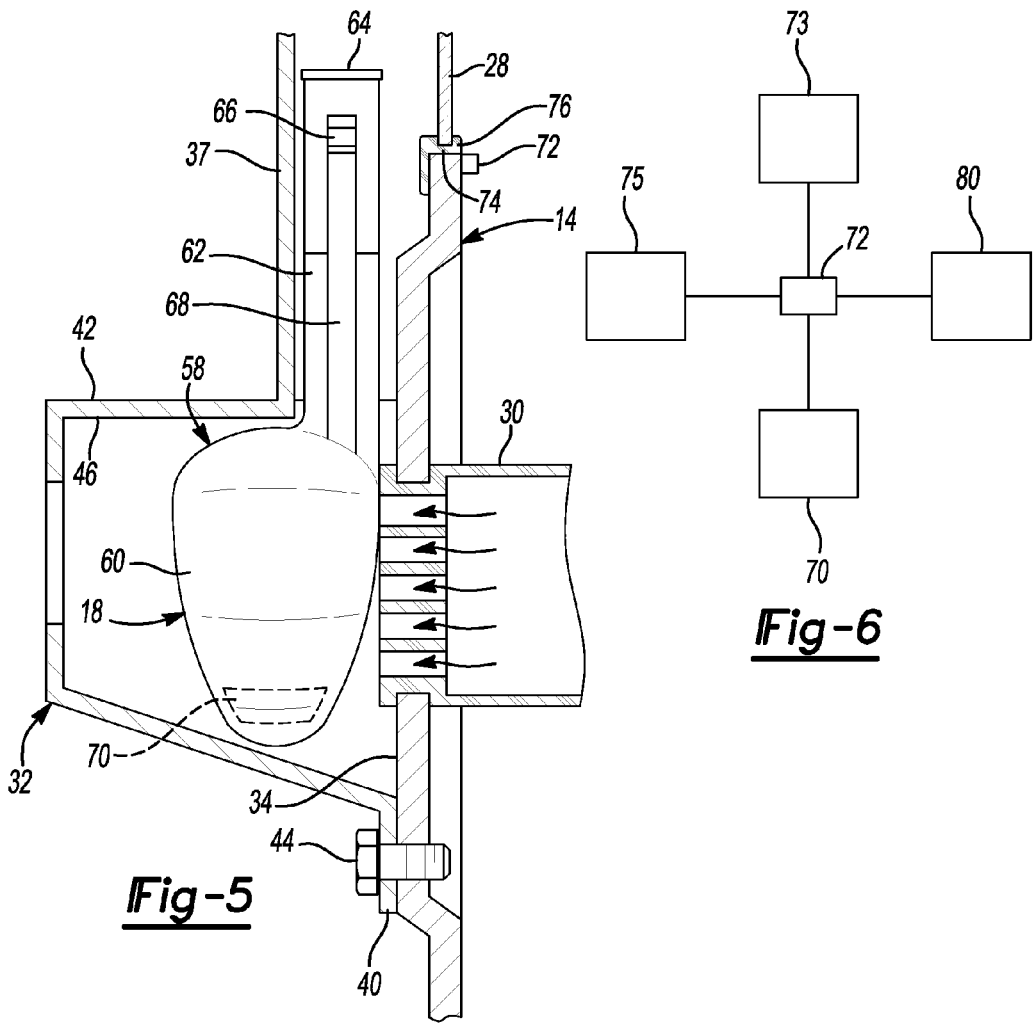
*Fig-5*
*Fig-6*

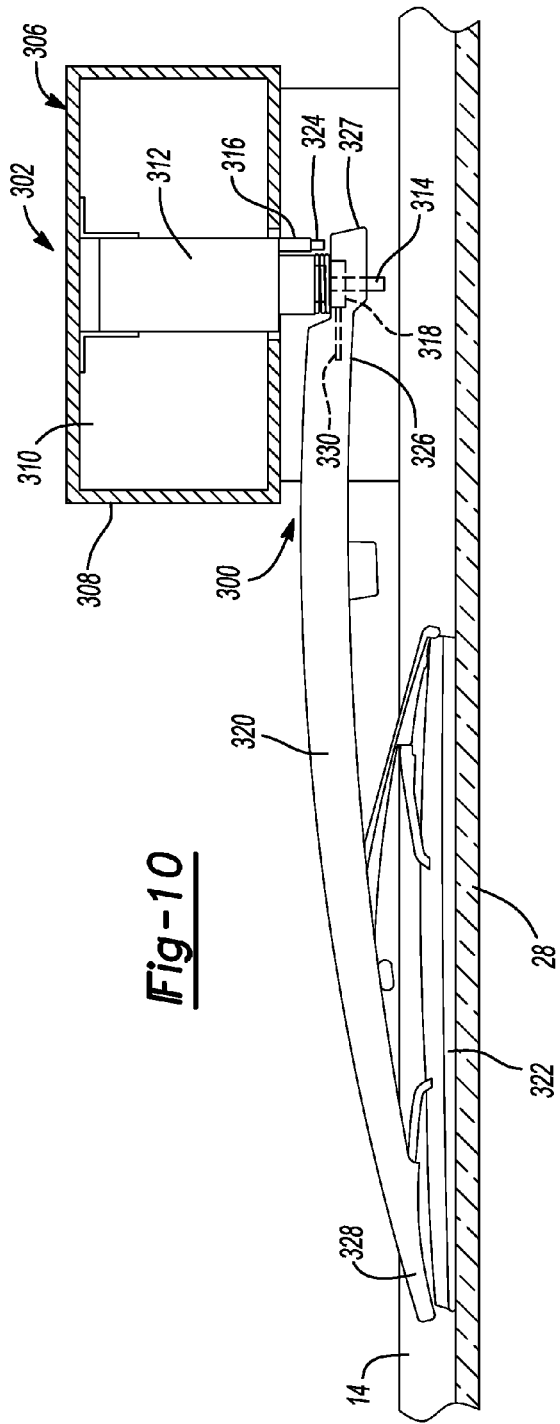
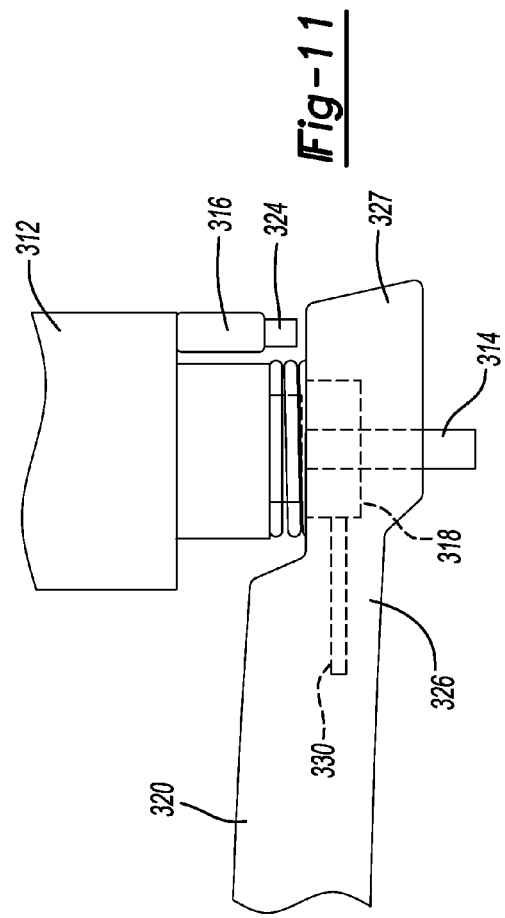

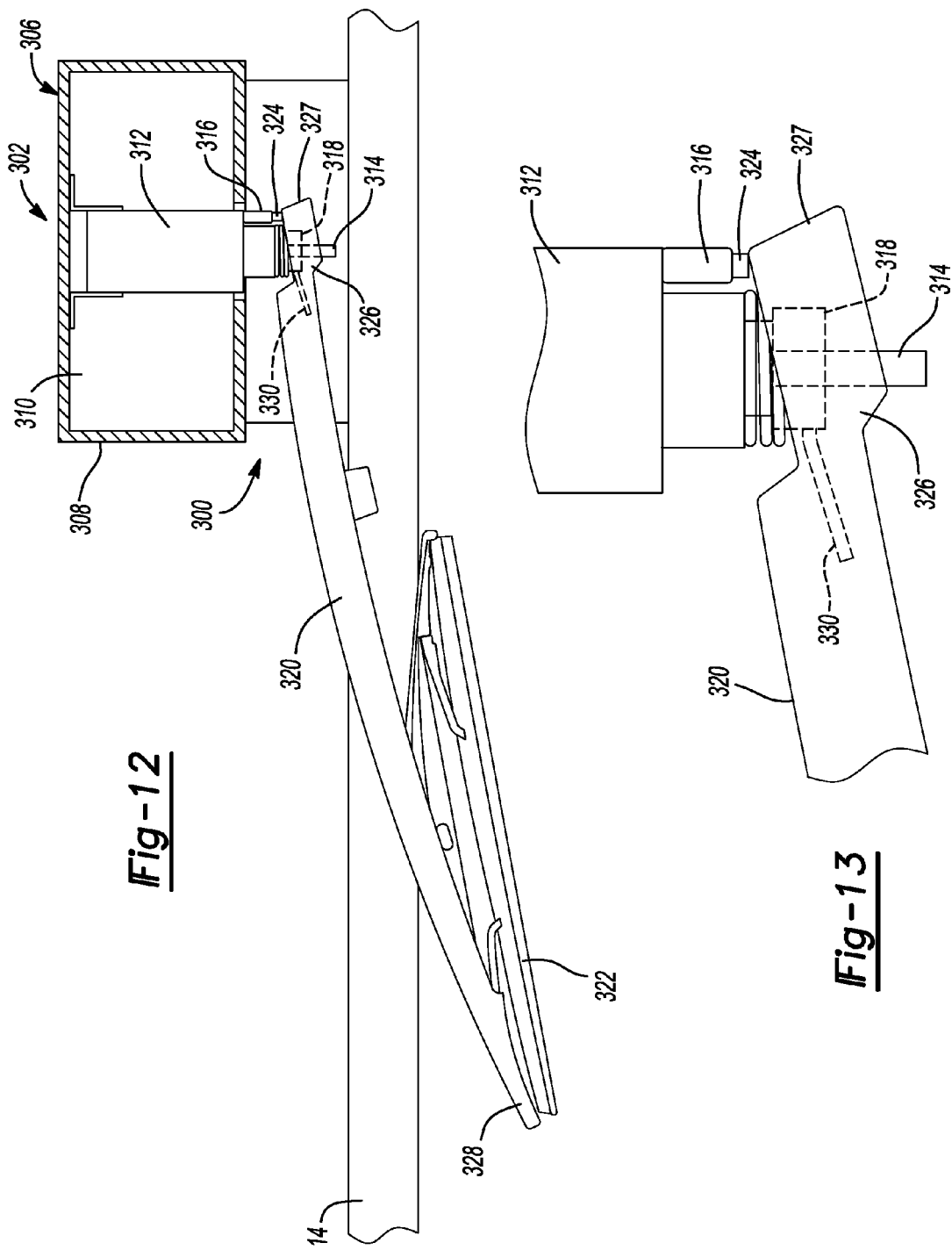

REAR WIPER SYSTEM

CROSS-REFERENCE TO RELATED APPLICATIONS

This application is a continuation-in-part of U.S. patent application Ser. No. 13/356,876 filed on Jan. 24, 2012. The entire disclosure of the above application is incorporated herein by reference.

FIELD

The present disclosure relates to a rear wiper system for a vehicle.

BACKGROUND

Many vehicles include a window washer system having a nozzle configured to spray washer fluid on a window of the vehicle and a wiper system configured to wipe water, dirt, debris, snow and/or ice off of the window. The wiper system may include front wipers for wiping a front windshield and a rear wiper for wiping a rear window. When the windshield or rear window becomes at least partially covered with dirt, debris, snow and/or ice, the driver of the vehicle may actuate a pump that causes washer fluid to be sprayed onto the windshield or the rear window. The wiper assembly may be configured to operate for a predetermined number of passes across the windshield in response to the washer system being actuated to wipe away the washer fluid, dirt, debris, snow and/or ice. In this manner, the washer system and wiper assembly may cooperate to clean the windshield and rear window of the vehicle to provide the driver with an unobstructed view through the windshield.

SUMMARY

In one form, the present disclosure provides a system for a vehicle. The vehicle may include a spare tire carrier mounted to a tailgate. The system may include a motor assembly, a wiper and a switch. The motor assembly may be mounted to the spare tire carrier and may include an output shaft that is rotatable relative to the spare tire carrier. The wiper may be attached to the output shaft for rotation with the output shaft relative to a rear window pane of the vehicle. The switch may be electrically connected to the motor assembly and may be operable to allow electrical current to reach the motor assembly when the wiper is in contact with the rear window pane. The switch may be operable to prevent electrical current from reaching the motor assembly in response to the wiper and the rear window pane being spaced apart from each other.

In some embodiments, the wiper may include a hub and an arm. The hub may be fixed to the output shaft. The arm may be pivotable relative to the hub and the output shaft between first and second positions. The wiper may be in contact with the rear window pane when the arm is in the first position. The wiper may be spaced apart from the rear window pane when the arm is in the second position.

In some embodiments, the wiper may include a spring biasing the arm toward the second position.

In some embodiments, the wiper may contact a portion of the switch when the wiper and the rear window pane are spaced apart from each other, and the wiper is spaced apart from the portion of the switch when the wiper and the rear window pane are in contact with each other.

In some embodiments, contact between the wiper and the portion of the switch may cause the switch to prevent electrical current from reaching the motor assembly.

In some embodiments, the system may include a window washer system having a fluid reservoir, a pump and a nozzle. The fluid reservoir may be adapted to store a quantity of window washer fluid. The window washer fluid may be pumped from the fluid reservoir through the nozzle. The nozzle may be configured to deposit the window washer fluid onto the rear window pane. The switch may be operable to selectively prevent electrical current from reaching the pump.

In some embodiments, the tailgate may be rotatable relative to the rear window pane.

In some embodiments, the rear window pane is a part of a roof assembly that is removable from the vehicle by a user.

In another form, the present disclosure provides a system for a vehicle that may include a motor assembly, a wiper and a switch. The motor assembly may be mounted to a rear portion of the vehicle and may include an output shaft that is rotatable relative to the rear portion of the vehicle. The wiper may be attached to the output shaft for rotation with the output shaft relative to a rear window pane of the vehicle. The switch may be electrically connected to the motor assembly and operable to allow electrical current to reach the motor assembly when the wiper is in contact with the rear window pane. The switch may also be operable to prevent electrical current from reaching the motor assembly in response to the wiper and the rear window pane being spaced apart from each other.

In some embodiments, the rear portion of the vehicle includes a tailgate that is rotatable relative to the rear window pane. The motor assembly may be mounted to the tailgate. In some embodiments, the tailgate may include a stop lamp assembly to which the motor assembly may be mounted. In some embodiments, the tailgate may include a spare tire carrier to which the motor assembly may be mounted. In some embodiments, the stop lamp assembly may be a part of the spare tire carrier. In other embodiments, the stop lamp assembly may be separate and discrete from the spare tire carrier.

Further areas of applicability of the present disclosure will become apparent from the detailed description, claims and drawings provided hereinafter. It should be understood that the detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

When an element or component is referred to as being "on," "engaged to," "connected to," or "coupled to" another element or component, it may be directly on, engaged, connected or coupled to the other element or component, or intervening elements or components may be present. In contrast, when an element or component is referred to as being "directly on," "directly engaged to," "directly connected to," or "directly coupled to" another element or component, there may be no intervening elements or components present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

BRIEF DESCRIPTION OF THE DRAWINGS

FIG. 4 is a partial view of the tailgate and the window washer system;

FIG. 5 is a partial cross-sectional view of the tailgate, a spare tire carrier and the window washer system;

FIG. 6 is a schematic representation of an electrical circuit including a switch according to the principles of the present disclosure;

FIG. 10 is a cross sectional view of the wiper assembly of FIG. 9 in a first position;

FIG. 11 is a partial view of a motor shaft, wiper arm and switch of the wiper assembly of FIG. 10 in the first position;

FIG. 12 is a cross sectional view of the wiper assembly of FIG. 9 in a second position; and FIG. 13 is a partial view of the motor shaft, wiper arm and switch in the second position.

DETAILED DESCRIPTION

Figure 1:
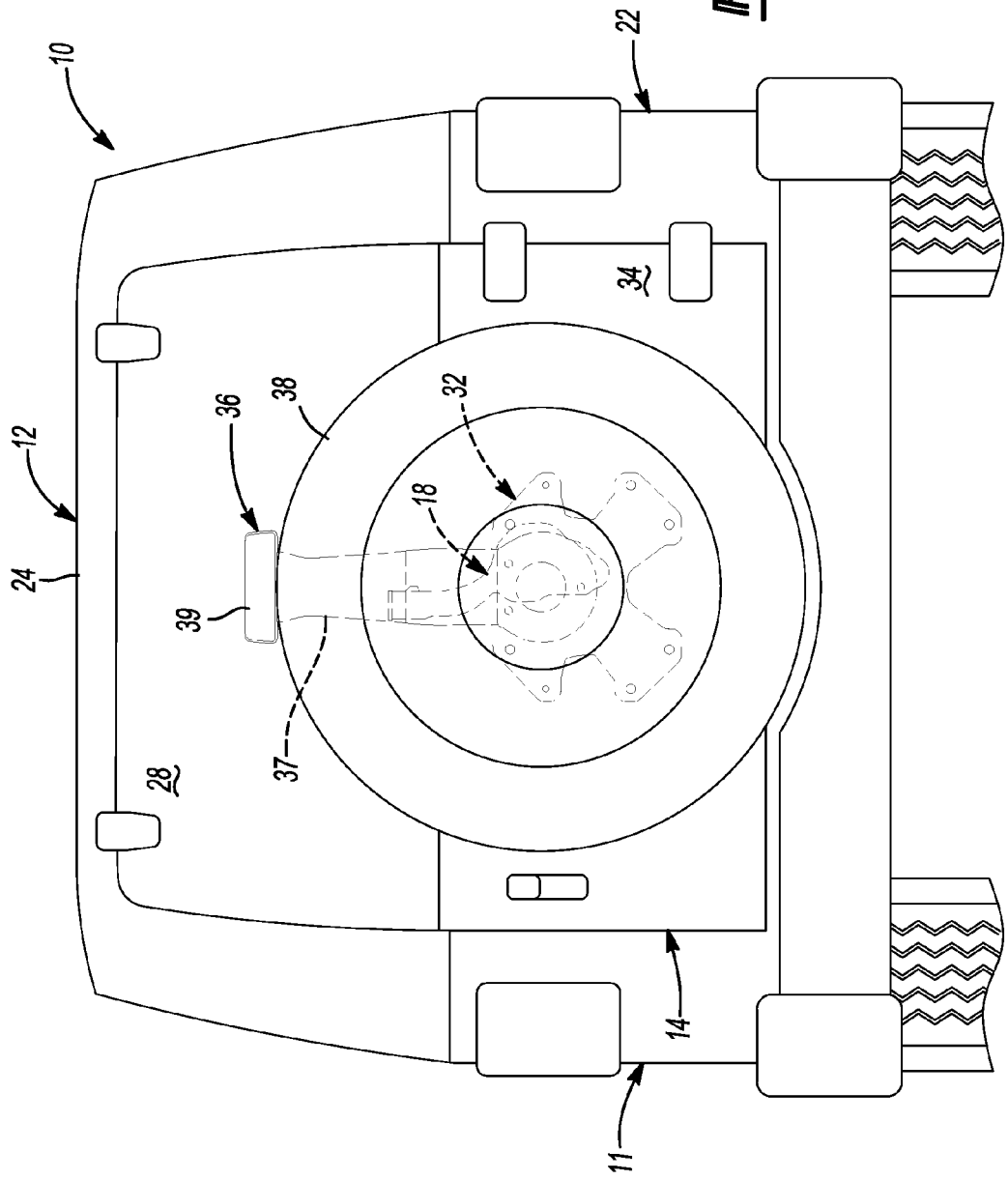
FIG. 1 is a rear view of a vehicle having a window washer system according to the principles of the present disclosure.

In an exemplary embodiment and with reference to FIGS. 1-6, a vehicle 10 is provided that may include a body 11 and a removable cabin-enclosure assembly 12. The body 11 may include a tailgate 14, a front windshield washer system 16, and a rear window washer system 18. As will be subsequently described, the front windshield washer system 16 may be disposed proximate a windshield at a front-end 20 of the vehicle 10, and the rear window washer system 18 may be attached to the tailgate 14 disposed at a rear-end 22 of the vehicle 10. The front windshield washer system 16 and the rear window washer system 18 may operate independently of each other and may be fluidly isolated from each other during operation. Because the front windshield washer system 16 and the rear window washer system 18 are fluidly isolated from each other, the vehicle 10 may not include any fluid supply line extending between the front windshield washer system 16 and the rear window washer system 18. Accordingly, the cabin-enclosure assembly 12 may be quickly and easily removed from and/or installed onto the vehicle 10 by a user (e.g., an owner, driver, passenger, etc.) of the vehicle 10, as desired, without having to disconnect and/or connect, respectively, any fluid supply line or any other conduit to transfer a washer fluid between the front windshield washer system 16 and the rear window washer system 18.

Figure 2:
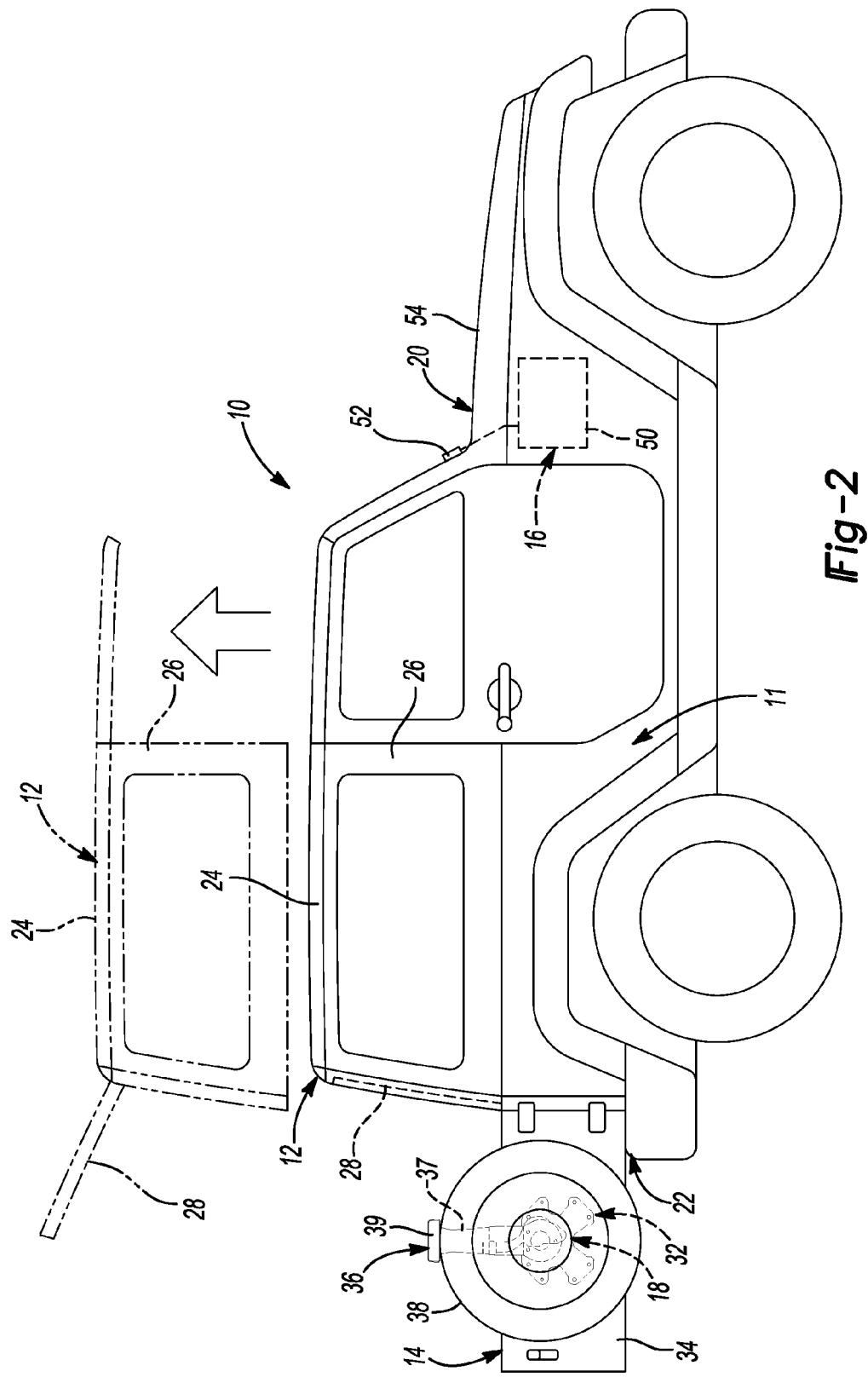
FIG. 2 is a side view of the vehicle of FIG. 1 with a removable roof and a tailgate in an open position.
Figure 3:
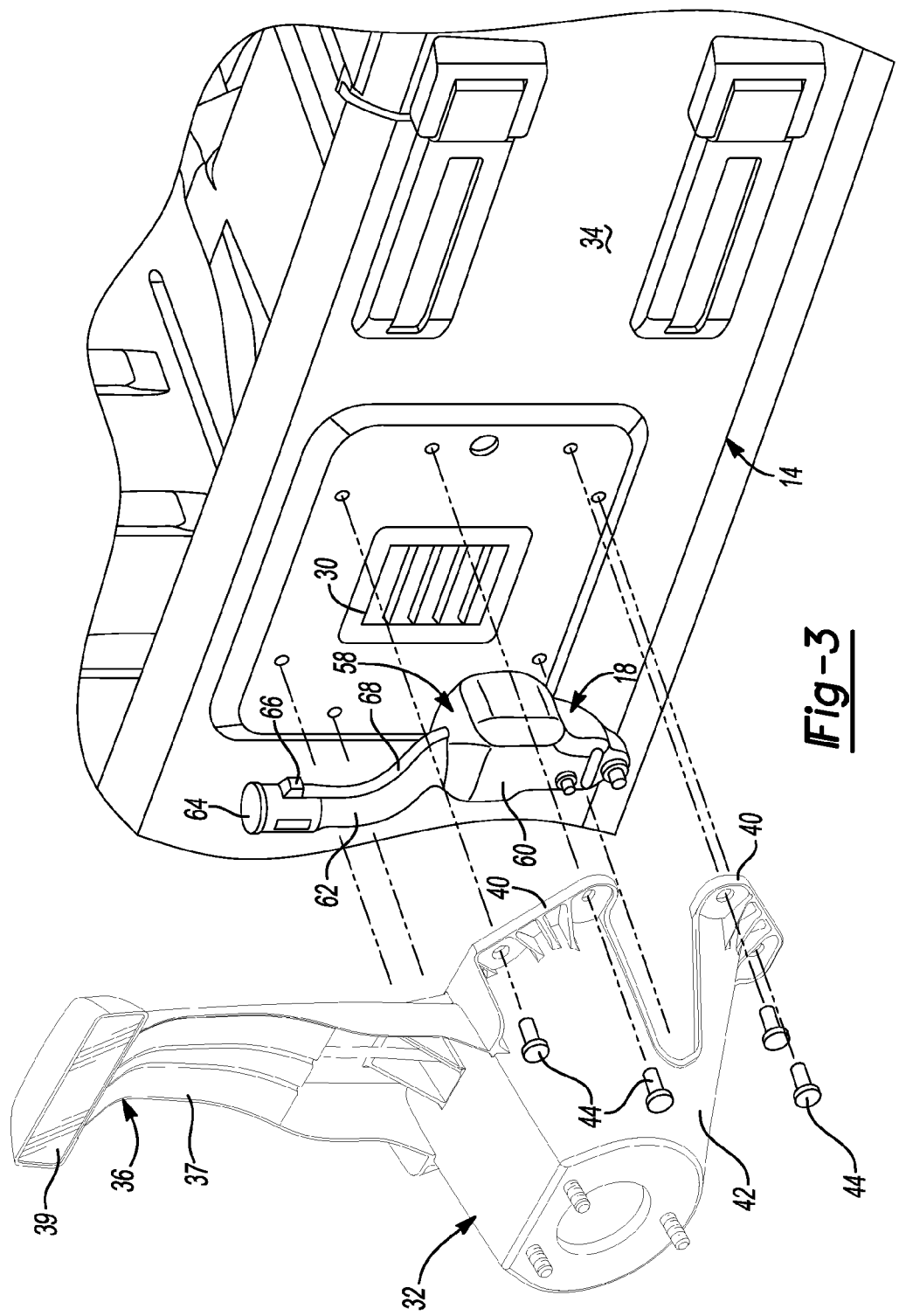
FIG. 3 is an exploded perspective view of the window washer system according to the principles of the present disclosure.

The cabin-enclosure assembly 12 may include a roof portion 24, side window portions 26, and a rear window 28. The cabin-enclosure assembly 12 may at least partially surround a cabin or interior of the vehicle 10 (shown in FIG. 2 in solid lines). The rear window 28 may be rotatable relative to the roof portion 24 between a closed position (shown in FIG. 2 in solid lines) and an open position (shown in FIG. 2 is phantom lines) to provide access to the interior of the vehicle 10. A user (e.g., the owner, driver, passenger of the vehicle 10) may remove the cabin-enclosure assembly 12 from the vehicle 10 (shown in FIG. 2 is phantom lines) in one or more pieces to provide an open-air environment in the vehicle 10 while the vehicle 10 is in use.

The tailgate 14 may be rotatable relative to the body 11 of the vehicle 10 between a closed position (FIG. 1) and an open position (FIG. 2) to provide access to the interior of the vehicle 10. The tailgate 14 may include a vent 30 (FIG. 3) extending therethrough to allow air within the interior of the vehicle 10 to vent to the ambient air outside of the vehicle 10 when an HVAC (heating, ventilation and air conditioning) system of the vehicle 10 is in a fresh-air mode (in which the HVAC system draws fresh air from outside of the vehicle 10) rather than an air-recirculation mode (in which the HVAC system recirculates the air in the interior of the vehicle 10).

A spare tire carrier 32 may be mounted to an exterior surface 34 of the tailgate 14. A CHMSL assembly 36 (i.e., a center high-mounted stop lamp assembly) may extend upward from the spare tire carrier 32. The CHMSL assembly 36 may include a tower portion 37 and a lamp 39. In some embodiments, the CHMSL assembly 36 may be integrally formed with the spare tire carrier 32. As shown in FIG. 5, the spare tire carrier 32 may include one or more mounting flanges 40 and a generally hollow hub 42 extending outwardly from the exterior surface 34 of the tailgate 14. The spare tire carrier 32 may be secured to the tailgate 14 by a plurality of fasteners 44 extending through the mounting flanges 40. The hub 42 may define a cavity 46. As shown in FIGS. 1 and 2, a spare tire 38 can be mounted to the hub 42.

A shown in FIG. 2, the front windshield washer system 16 may include a front fluid reservoir 50 and one or more front nozzles 52 in fluid communication with the front fluid reservoir 50. The front fluid reservoir 50 may contain a volume of washer fluid and may supply the washer fluid to the front nozzles 52. The front fluid reservoir 50 may be disposed under a hood 54 of the vehicle 10 in or proximate an engine compartment of the vehicle 10, for example. The front nozzles 52 may extend through the hood 54 of the vehicle 10, or may be disposed in any other suitable location, such as integrated with or proximate one or both front windshield wipers, for example. A pump (not specifically shown) may be in fluid communication with the front fluid reservoir 50 and the front nozzles 52. The pump may be operable to cause washer fluid in the front fluid reservoir 50 to flow through the front nozzles 52 and spray onto the front windshield in response to a user actuating a first control switch in the interior of the vehicle 10.

The rear window washer system 18 may be disposed between the spare tire carrier 32 and the exterior surface 34 of the tailgate 14, and may be attached to the exterior surface 34 and/or the spare tire carrier 32 in any suitable manner (e.g., via fasteners, snap fit, interference fit, ultrasonic welding, and/or adhesive bonding, etc.). The rear window washer system 18 may be operable to spray a washer fluid onto the rear window 28. The rear window washer system 18 may include a housing 58 defining a rear fluid reservoir 60, a fill neck 62, a fill cap 64, a nozzle 66, a conduit 68, and a pump 70.

The housing 58 can be blow molded, for example, or otherwise formed from a polymeric or metallic material. The rear fluid reservoir 60, fill neck 62, and conduit 68 can be integrally formed with each other. The nozzle 66 can be adhesively bonded and/or pressed into engagement with the conduit 68, for example. The rear fluid reservoir 60 may contain a volume of washer fluid and may be positioned on the tailgate 14 such that it may be in contact with and/or disposed adjacent the vent 30. In this manner, relatively warm air from interior of the vehicle 10 may be exhausted through the vent 30 to warm the rear fluid reservoir 60 to restrict or prevent the washer fluid therein from freezing in cold weather. A portion of the rear fluid reservoir 60 may extend into the cavity 46 of the hub 42 of the spare tire carrier 32.

The fill neck 62 may be a generally tubular member extending upward from the rear fluid reservoir 60 and may be in fluid communication therewith. The fill cap 64 may be disposed on a distal end of the fill neck 62 and may be pivotable relative to the fill neck 62 between a closed position and an open position. A user may selectively open the fill cap 64 to pour washer fluid into the fill neck 62 to fill or refill the rear fluid reservoir 60.

The nozzle 66 may extend from the fill neck 62 at an appropriate position relative to the rear window 28. The conduit 68 may be in fluid communication with the conduit 68 and the rear fluid reservoir 60. The conduit 68 may extend into or near a bottom portion of the rear fluid reservoir 60. In some embodiments, the conduit 68 may be integrally formed with the fill neck 62 or the conduit 68 can be a separate and distinct member extending through an interior of the fill neck 62 or along an exterior of the fill neck 62. While the nozzle 66 is described herein and shown in the figures as being mounted to or integrated with the fill neck 62, in other embodiments, the nozzle 66 could be separated from the fill neck 62 and/or disposed in any other location to enable the nozzle 66 to provide washer fluid to the rear window 28.

The pump 70 may be disposed within the housing 58 and may cause washer fluid in the rear fluid reservoir 60 to flow through the conduit 68, through the nozzle 66 in a predetermined spray pattern, and onto the rear window 28 in response to the user actuating a second control switch in the interior of the vehicle 10. The second control switch may also cause a rear window wiper to actuate a predetermined number of times to wipe the washer fluid and dirt, mud, snow and/or ice off of the rear window 28. In some embodiments, wiring that electrically couples the pump 70 to an electrical power source 73 could be integrated with wiring connecting the lamp 39 of the CHMSL assembly 36 to the electrical power source 73. The electrical power source 73 could include a battery, an electrical generator, and/or a fuel cell, for example.

In some embodiments, a kill switch 72 (shown schematically in FIGS. 5 and 6) may be in electrical communication with the electrical power source 73 and the pump 70. The kill switch 72 may be operable to control a flow of electrical current to the pump 70. The kill switch 72 may be configured to allow electrical current to reach the pump 70 when the removable cabin-enclosure assembly 12 is positioned on the body 11 of the vehicle 10 and the rear window 28 is in the closed position. The kill switch 72 may also be configured to prevent electrical current from reaching the pump 70 when the rear window 28 is in the open position and/or the cabin-enclosure assembly 12 is removed from the body 11 of the vehicle 10. In some embodiments, the kill switch 72 could be disposed at a location proximate an upper end 74 of the tailgate 14 and/or a bottom edge 76 of the rear window 28 so that the kill switch 72 can sense when the rear window 28 is closed and attached to the tailgate 14. In other embodiments, the kill switch 72 could be disposed at any other suitable location and configured in any suitable manner to provide the functionality described herein. In some embodiments, the kill switch 72 could also be configured to selectively electrically couple the electrical power source 73 and a defrost coil 75 (shown schematically in FIG. 6) embedded in the rear window 28. In some embodiments, the kill switch 72 could also be configured to selectively electrically couple the electrical power source 73 and a motor of a rear window wiper assembly 80 (shown schematically in FIG. 6).

As described above, the front windshield washer system 16 and the rear window washer system 18 may be fluidly isolated from each other. Therefore, the vehicle 10 may not include any fluid supply line extending between the front windshield washer system 16 and the rear window washer system 18. Accordingly, the cabin-enclosure assembly 12 may be quickly and easily removed from and/or installed onto the vehicle 10 by the user of the vehicle 10, as desired, without having to disconnect and/or connect, respectively, any fluid supply line or any other conduit to provide a washer fluid from the front windshield washer system 16 to the rear window washer system 18. The lack of a fluid supply line extending between the front windshield washer system 16 and the rear window washer system 18 may also reduce a possibility of washer fluid leakage, reduces components and assembly steps to simplify manufacturing of the vehicle 10.

In some embodiments, the rear window washer system 18 can be preassembled with the spare tire carrier 32, and then assembled onto the vehicle 10 as a module. In this manner, a single parts-supplier could supply such a module to the manufacturer of the vehicle 10, thereby simplifying the manufacturer's supply chain.

Figure 7:
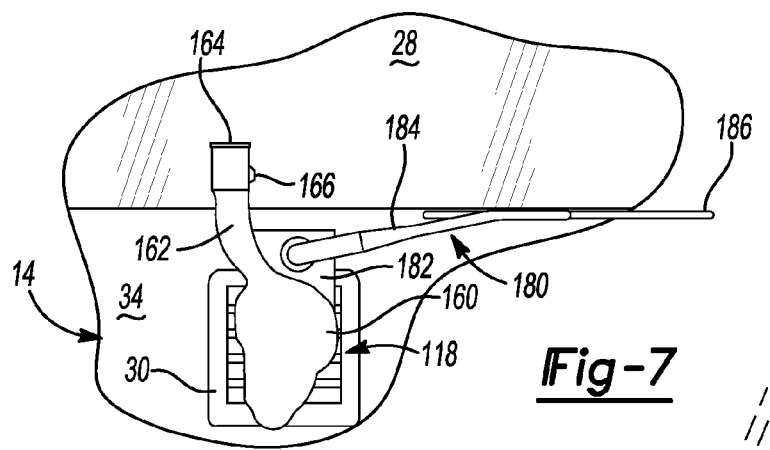
FIG. 7 is a rear view of another embodiment of a window washer system having an integrated wiper according to the principles of the present disclosure.

With reference to FIG. 7, another rear window washer system 118 is provided. The structure and function of the rear window washer system 118 may be substantially similar to that of the rear window washer system 18 described above, apart from any exceptions described below and/or shown in the figures. Briefly, the rear window washer system 118 may include a rear fluid reservoir 160, a fill neck 162, a fill cap 164, a nozzle 166 and a conduit providing fluid communication between the rear fluid reservoir 160 and the nozzle 166. The rear fluid reservoir 160, fill neck 162, fill cap 164, nozzle 166 and conduit may be substantially similar to the rear fluid reservoir 60, fill neck 62, fill cap 64, nozzle 66 and a conduit 68 described above, and therefore, will not be described again in detail.

The rear window washer system 118 may also include an integrated rear window wiper assembly 180. The rear window wiper assembly 180 may include a base 182 integrally formed with the rear fluid reservoir 160 and/or the fill neck 162. A wiper arm 184 may extend from the base 182 and may be rotatable relative thereto. A motor may be disposed in the base 182, for example, that rotatably drives the wiper arm 184 relative to the rear window 28. A wiper blade 186 may be attached to the wiper arm 184 and may be operable to wipe moisture, dirt and/or debris from the rear window 28. In some embodiments, the wiper arm 184 may extend from the fill neck 162. In other embodiments, the wiper arm 184 may extend from the rear fluid reservoir 160. In such embodiments, the motor driving the wiper arm 184 could be disposed inside of a housing defining or integrally formed with the rear fluid reservoir 160, for example. In some embodiments, the wiper arm 184 and/or the wiper blade 186 may be "docked" or positioned on the exterior surface 34 of the tailgate 14 when the rear window wiper assembly 180 is not in use (as shown in FIG. 7). In some embodiments, wiring electrically coupling the motor of the wiper assembly 180 to an electrical power source could be integrated with wiring connecting the lamp 39 of the CHMSL assembly 36 to the electrical power source.

In some embodiments, the kill switch 72 may be configured to allow electrical current to reach the motor of the wiper assembly 180 when the removable cabin-enclosure assembly 12 is positioned on the body 11 of the vehicle 10 and the rear window 28 is in the closed position. The kill switch 72 may also be configured to prevent electrical current from reaching the motor of the wiper assembly 180 when the rear window 28 is in the open position and/or the cabin-enclosure assembly 12 is removed from the body 11 of the vehicle 10.

Figure 8:
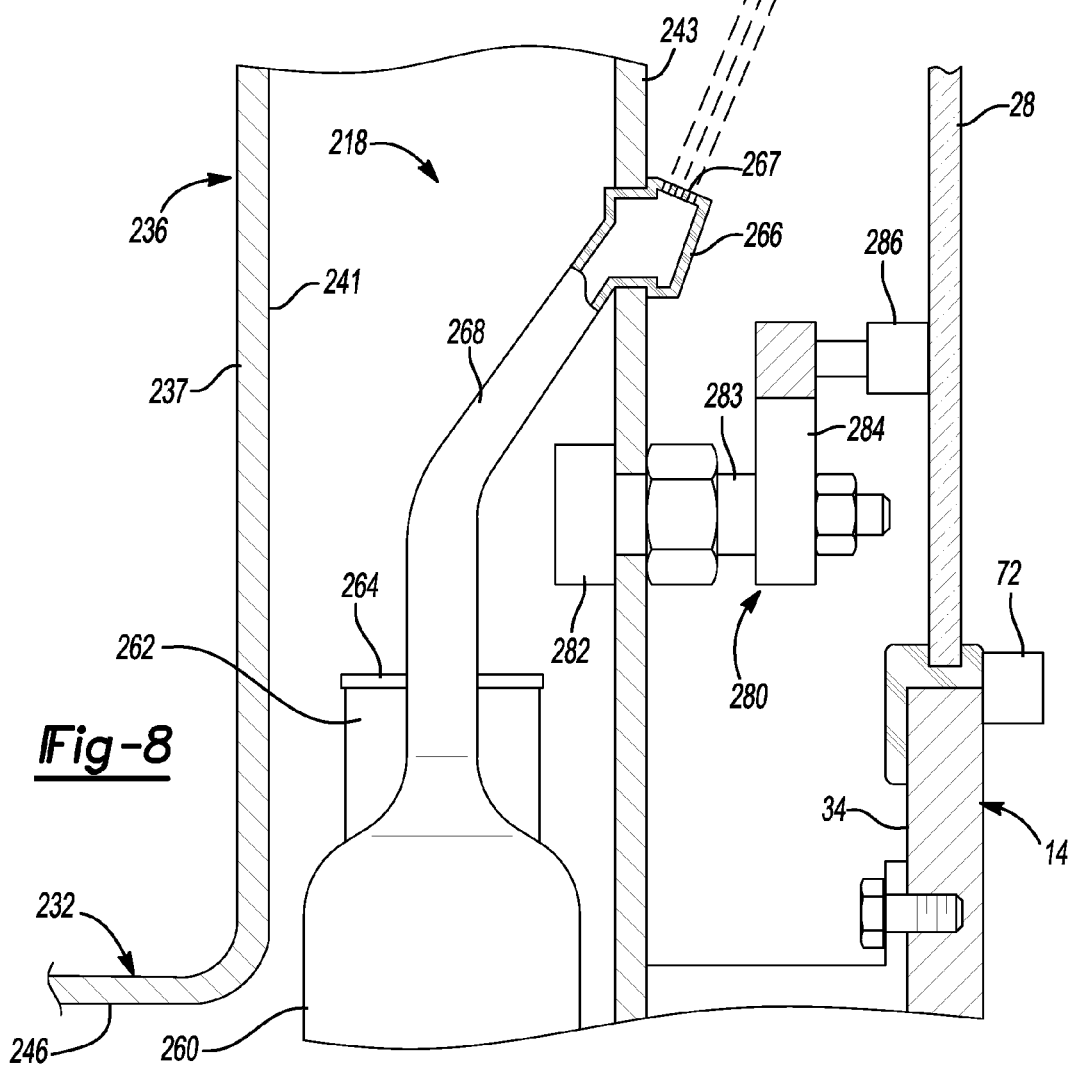
FIG. 8 is a cross-sectional view of yet another embodiment of a window washer system according to the principles of the present disclosure

With reference to FIG. 8, another rear window washer system 218 is provided. The structure and function of the rear window washer system 218 may be generally similar to that of the rear window washer systems 18, 118 described above, apart from any exceptions described below and/or shown in the figures. The rear window washer system 218 may include a rear fluid reservoir 260, a fill neck or tube 262, a fill cap 264, a nozzle 266, and a conduit 268. The rear window washer system 218 may be mounted to a spare tire carrier 232 and/or a CHMSL assembly 236. The spare tire carrier 232 and CHMSL assembly 236 may be generally similar to spare tire carrier 32 and CHMSL assembly 36 described above, except a tower portion 237 of the CHMSL assembly 236 may be a generally hollow member forming a cavity 241.

The rear fluid reservoir 260 may be housed within the cavity 241 of the tower portion 237 and/or a cavity 246 of the spare tire carrier 232. The fill neck 262 may extend out of the cavity 241 and/or cavity 246 so that the fill cap 264 and fill neck 262 are accessible to the user. The conduit 268 may extend through a portion of the cavity 241 in the tower portion 237 to the nozzle 266. The nozzle 266 may extend through a wall 243 of the tower portion 237 and may include nozzle openings 267 directed toward the rear window 28 so that fluid ejected from the nozzle 266 is sprayed onto the rear window 28. A pump of the rear window washer system 218 may be in communication with the kill switch 72, in the manner described above with reference to the rear window washer system 18. In some embodiments, wiring electrically coupling the motor of the wiper pump of the rear window washer system 218 to an electrical power source could be integrated with wiring connecting the lamp 39 of the CHMSL assembly 36 to the electrical power source.

A wiper assembly 280 may extend from the wall 243 of the tower portion 237 and may include a motor assembly 282, a drive shaft 283, a wiper arm 284, and a wiper blade 286. In some embodiments, wiring electrically coupling the motor assembly 282 of the wiper assembly 280 to the electrical power source could be integrated with wiring connecting the lamp 39 of the CHMSL assembly 36 to the electrical power source.

In some embodiments, the motor assembly 282 may be connected to the electrical power source via the kill switch 72, for example. The kill switch 72 may be configured to allow electrical current to reach the motor assembly 282 when the removable cabin-enclosure assembly 12 is positioned on the body 11 of the vehicle 10 and the rear window 28 is in the closed position. The kill switch 72 may be configured to prevent electrical current from reaching the motor assembly 282 when the rear window 28 is in the open position and/or the cabin-enclosure assembly 12 is removed from the body 11 of the vehicle 10.

The motor assembly 282 may rotatably drive the drive shaft 283, which in turn rotates the wiper arm 284 and wiper blade 286 relative to the rear window 28. While the wiper assembly 280 is shown in FIG. 8 as being disposed in contact with the rear window 28 when the wiper assembly 280 is not in use, in some embodiments, the wiper assembly 280 can be configured and/or positioned such that the wiper blade 286 may be docked on the exterior surface 34 of the tailgate 14, as described above.

Figure 9:
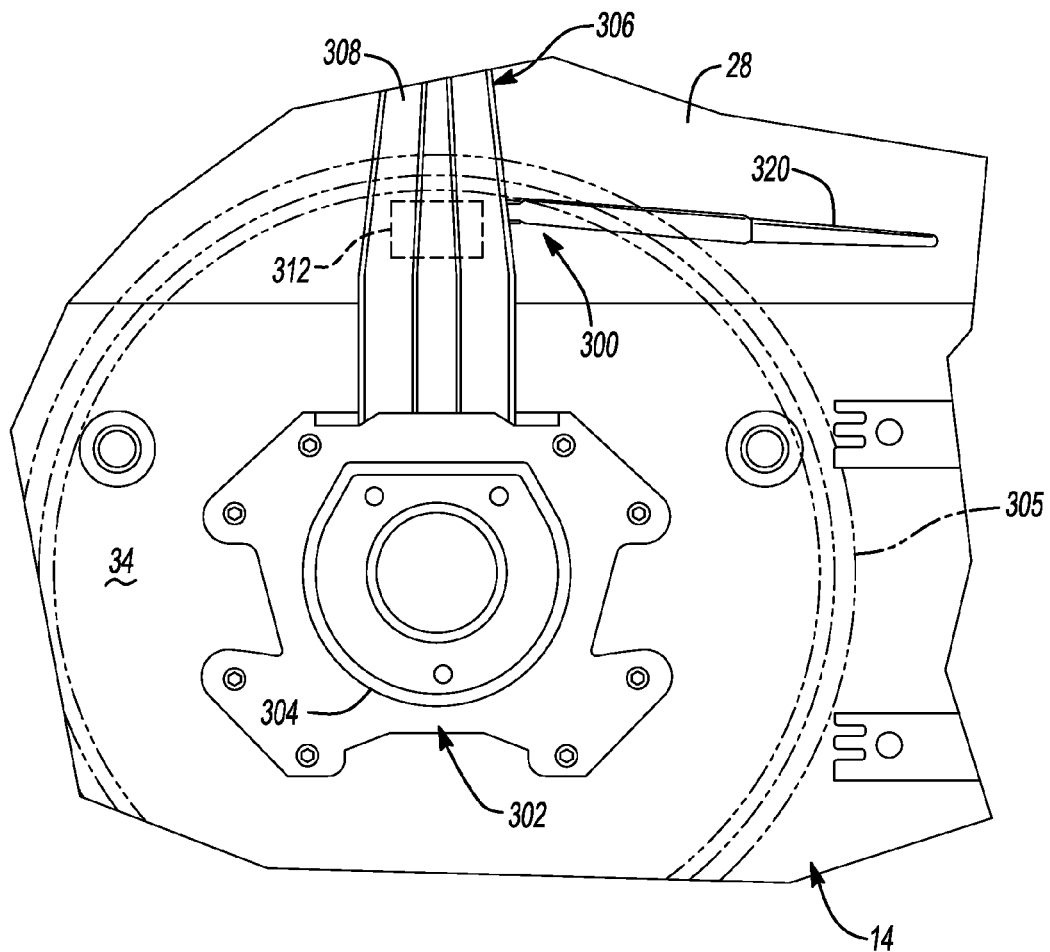
FIG. 9 is a partial view of a tailgate having a spare tire carrier and another wiper assembly according to the principles of the present disclosure.

With reference to FIGS. 9-13, another wiper assembly 300 is provided. The wiper assembly 300 may be generally similar to the wiper assembly 280, apart from any exceptions described below and/or shown in the figures. The wiper assembly 300 may be mounted to a spare tire carrier 302 which may be mounted to the exterior surface 34 of the tailgate 14 (as shown in FIG. 9). The wiper assembly 300 may be operable to selectively wipe the rear window 28 when the wiper assembly 300 is in an activated mode. The wiper assembly 300 may be deactivated when the tailgate 14 is in the open position (shown in FIG. 2), when the rear window 28 is flipped open and/or when the cabin-enclosure assembly 12 is removed from the body 11 of the vehicle 10 (shown in phantom lines in FIG. 2), for example. That is, when the tailgate 14 and the rear window 28 are separated from each other, the wiper assembly 300 may be deactivated to prevent or restrict operation of the wiper assembly 300.

As shown in FIG. 9, the spare tire carrier 302 may include a spare tire hub 304 and a CHMSL assembly 306 extending upward therefrom. The spare tire hub 304 may be configured to receive and retain a spare tire 305. Like the CHMSL assembly 236, the CHMSL assembly 306 may include a tower portion 308 that may be integrally formed with or attached to the spare tire hub 304. The tower portion 308 may include a cavity 310 formed therein (shown in FIGS. 10 and 12). A brake light or lamp (not shown) may be disposed at or near an upper end of the CHMSL assembly 306. It will be appreciated that the CHMSL assembly 306 could be a part of the spare tire carrier 302, as described above, or the CHMSL assembly 306 could be separate and discrete from the spare tire carrier 302.

As shown in FIGS. 10 and 12, the wiper assembly 300 may include a motor 312, a drive shaft 314, a kill switch 316, a wiper hub 318, a wiper arm 320, and a wiper blade 322. The motor 312 may be mounted to or within the CHMSL assembly 306 or to any other suitable portion of the tailgate 14 or spare tire carrier 302. In the particular embodiment illustrated in FIGS. 9-13, the motor 312 is mounted within the cavity 310 of the CHMSL assembly 306. The motor 312 may engage the drive shaft 314 and may cause the drive shaft 314 to rotate relative to the tailgate 14 and rear window 28 about a longitudinal axis of the drive shaft 314. The motor may receive electrical power from any suitable power source of the vehicle 10. The drive shaft 314 may extend out of the cavity 310 through an opening in the tower portion 308. Alternatively, a portion of the motor 312 may extend through the opening in the tower portion 308.

The kill switch 316 may be mounted to the motor 312, the tower portion 308, the wiper arm 320 or to any other suitable location. The kill switch 316 may be electrically coupled to the motor 312 and may include a member 324 (shown best in FIGS. 11 and 13) that is movable between a first position (FIGS. 10 and 11) in which the kill switch 316 allows electrical current to reach the motor 312 and a second position (FIGS. 12 and 13) in which the kill switch 316 prevents electrical current from reaching the motor 312. As will be subsequently described, movement of the wiper arm 320 from a first position (FIGS. 10 and 11) to a second position (FIGS. 12 and 13) may cause the movement of the member 324 to the second position. The member 324 may be springbiased toward the first position such that as the wiper arm 320 moves toward its first position, the member 324 will also move toward its first position.

The wiper hub 318 (shown schematically in FIGS. 10-13) may be fixedly attached to the drive shaft 314 and may rotate with the drive shaft 314 relative to the tailgate 14 and rear window 28. The wiper arm 320 may include first and second ends 326, 328. The first end 326 may include a collar 327 that at least partially surrounds the wiper hub 318 and is attached to the wiper hub 318 at a hinged connection. In this manner, the wiper arm 320 may pivot about an axis that may extend through the wiper hub 318 in a direction substantially perpendicular to the longitudinal axis of the drive shaft 314. In this manner, the wiper arm 320 may pivot relative to the wiper hub 318 between the first position (FIG. 10) and the second position (FIG. 12). A spring 330 may extend between the wiper hub 318 and the wiper arm 320 and may bias the wiper arm 320 toward the second position. The connection between the wiper arm 320 and the wiper hub 318 is such that rotational motion of the drive shaft 314 about the longitudinal axis of the drive shaft 314 is transmitted to the wiper arm 320 so that the wiper arm 320 may also rotate about the longitudinal axis of the drive shaft 314.

The wiper blade 322 may be mounted to the second end 328 of the wiper arm 320. The wiper blade 322 may be movable and/or deformable relative to the wiper arm 320 so that the wiper blade 322 may conform to the shape or any contours of the rear window 28.

With continued reference to FIGS. 9-13, operation of the wiper assembly 300 will be described in detail. As described above, the wiper assembly 300 may be operable to selectively wipe the rear window 28 when the tailgate 14 is closed and the rear window 28 is flipped down to the closed position (as shown in FIGS. 1, 9 and 10). The wiper assembly 300 may be deactivated when the tailgate 14 is in the open position (shown in FIG. 2), when the rear window 28 is flipped open and/or when the cabin-enclosure assembly 12 is removed from the body 11 of the vehicle 10 (shown in phantom lines in FIG. 2), for example.

As shown in FIGS. 10 and 11, when the tailgate 14 is closed and the rear window 28 is flipped down to the closed position, the wiper blade 322 may contact the rear window 28. This contact between the wiper blade 322 and the rear window 28 may maintain the wiper arm 320 in the first position in which the collar 327 of the wiper arm 320 is spaced apart from the member 324 of the kill switch 316. As described above, in this configuration, the kill switch 316 may allow electrical current to reach the motor 312, thereby allowing the motor 312 to rotate the drive shaft 314 (and thus, the wiper arm 320) about the longitudinal axis of the drive shaft 314 to wipe water, snow, dirt, mud, etc. from the rear window 28.

As the tailgate 14 is moved to the open position (and/or as the rear window 28 is otherwise separated from the tailgate 14), the biasing force of the spring 330 may pivot the wiper arm 320 relative to the wiper hub 318 toward the second position (FIGS. 12 and 13). When the wiper arm 320 moves into the second position, the collar 327 of the wiper arm 320 may force the member 324 of the kill switch 316 into its second position. In this configuration, the kill switch 316 may prevent electrical current from reaching the motor 312, thereby deactivating the wiper assembly 300.

When the rear window 28 is in the closed position, moving the tailgate 14 into its closed position may cause the wiper arm 320 to move back into the first position. That is, as the tailgate 14 is moving into the closed position, contact between the wiper blade 322 and the rear window 28 may force the wiper arm 320 back toward the first position so that the window wiper assembly 300 may return to an active mode.

It will be appreciated that the motor 312 may be electrically connected to an additional switch (not shown) that the driver of the vehicle may move between off and on positions. Accordingly, electrical current may reach the motor 312 when the kill switch 316 is in the first position and the driver-controlled switch is also in the on position. Placing the driver-controlled switch in the off position may prevent electrical current from reaching the motor 312 regardless of whether the kill switch 316 is in the first or second position.

It will be appreciated that the kill switch 316 may also be operable to selectively activate and deactivate a pump of a rear window washer system (e.g., the rear window washer system 18, 118, 218). That is, when the wiper arm 320 is in the first position (FIGS. 10 and 11), the kill switch 316 may allow electrical current to reach the pump motor of the window washer system. When the wiper arm 320 is in the second position (FIGS. 12 and 13), the kill switch 316 may prevent electrical current from reaching the pump motor of the window washer system. Like the wiper assembly 300, the pump motor of the rear window washer system may be electrically connected to an additional driver-controlled switch.

What is claimed is:

1. A system for a vehicle, the vehicle having a spare tire carrier mounted to a tailgate, the system comprising:
    a motor assembly mounted to the spare tire carrier and including an output shaft that is rotatable relative to the spare tire carrier;
    a wiper attached to the output shaft for rotation with the output shaft relative to a rear window pane of the vehicle, the wiper being pivotable independently of the output shaft between a first position in which the wiper is in contact with the rear window pane and a second position in which the wiper is spaced apart from the window pane; and
    a switch electrically connected to the motor assembly and operable to allow electrical current to reach the motor assembly when the wiper is in contact with the rear window pane and prevent electrical current from reaching the motor assembly in response to the wiper and the rear window pane being spaced apart from each other,
    wherein movement of the wiper into the second position independently of the output shaft switches the switch into a first configuration in which the switch prevents electrical current from reaching the motor assembly and movement of the wiper into the first position independently of the output shaft switches the switch into a second configuration in which the switch allows electrical current to reach the motor assembly,
    wherein the wiper contacts a movable member of the switch when the wiper and the rear window pane are spaced apart from each other and maintains the movable member in a first position corresponding to the first configuration, and the wiper is spaced apart from the movable member of the switch when the wiper and the rear window pane are in contact with each other and allows the movable member to be in a second position corresponding to the second configuration.

2. The system of claim 1, wherein the wiper includes a hub and an arm, the hub being fixed to the output shaft, the arm being pivotable relative to the hub and the output shaft between first and second positions, wherein the wiper is in contact with the rear window pane when the arm is in the first position and the wiper is spaced apart from the rear window pane when the arm is in the second position.

3. The system of claim 2, wherein the wiper includes a spring biasing the arm toward the second position.

4. The system of claim 1, further comprising a window washer system having a fluid reservoir, a pump and a nozzle, the fluid reservoir adapted to store a quantity of window washer fluid, the pump pumping the window washer fluid from the fluid reservoir through the nozzle, the nozzle being configured to deposit the window washer fluid onto the rear window pane, wherein the switch is operable to selectively prevent electrical current from reaching the pump.

5. The system of claim 1, wherein the tailgate is movable relative to the rear window pane.

6. The system of claim 1, wherein the rear window pane is a part of a roof assembly that is removable from the vehicle by a user.

7. A system for a vehicle comprising:
a motor assembly mounted to a rear portion of the vehicle and including an output shaft that is rotatable relative to the rear portion of the vehicle;
a wiper attached to the output shaft for rotation with the output shaft relative to a rear window pane of the vehicle, the wiper being pivotable independently of the output shaft between a first position in which the wiper is in contact with the rear window pane and a second position in which the wiper is spaced apart from the window pane; and
a switch electrically connected to the motor assembly and operable to allow electrical current to reach the motor assembly when the wiper is in contact with the rear window pane and prevent electrical current from reaching the motor assembly in response to the wiper and the rear window pane being spaced apart from each other,
wherein movement of the wiper into the second position independently of the output shaft switches the switch into a first configuration in which the switch prevents electrical current from reaching the motor assembly and movement of the wiper into the first position independently of the output shaft switches the switch into a second configuration in which the switch allows electrical current to reach the motor assembly,
wherein the wiper contacts a movable member of the switch when the wiper and the rear window pane are spaced apart from each other and maintains the movable member in a first position corresponding to the first configuration, and the wiper is spaced apart from the movable member of the switch when the wiper and the rear window pane are in contact with each other and allows the movable member to be in a second position corresponding to the second configuration.

8. The system of claim 7, wherein the wiper includes a hub and an arm, the hub being fixed to the output shaft, the arm being pivotable relative to the hub and the output shaft between first and second positions, wherein the wiper is in contact with the rear window pane when the arm is in the first position and the wiper is spaced apart from the rear window pane when the arm is in the second position.

9. The system of claim 8, wherein the wiper includes a spring biasing the arm toward the second position.

10. The system of claim 7, further comprising a window washer system having a fluid reservoir, a pump and a nozzle, the fluid reservoir being adapted to store a quantity of window washer fluid, the pump pumping the window washer fluid from the fluid reservoir through the nozzle, the nozzle being configured to deposit the window washer fluid onto the rear window pane, wherein the switch is operable to selectively prevent electrical current from reaching the pump.

11. The system of claim 7, wherein the rear portion of the vehicle includes a tailgate that is movable relative to the rear window pane.

12. The system of claim 11, wherein the tailgate includes a spare tire carrier, and wherein the motor assembly is mounted to the spare tire carrier.

13. The system of claim 11, wherein the tailgate includes a stop lamp assembly, and wherein the motor assembly is mounted to the stop lamp assembly.

14. The system of claim 12, wherein the tailgate is movable relative to the rear window pane between an open-tailgate position and a closed-tailgate position, and wherein the rear window pane is movable from a closed-window position to an open-window position only when the tailgate is in the open-tailgate position, and wherein moving the tailgate from the closed-tailgate position to the open-tailgate position moves the wiper from the first position to the second position.

15. The system of claim 7, wherein the rear window pane is a part of a roof assembly that is removable from the vehicle by a user.

16. The system of claim 1, wherein the tailgate is movable relative to the rear window pane between an open-tailgate position and a closed-tailgate position, and wherein the rear window pane is movable from a closed-window position to an open-window position only when the tailgate is in the open-tailgate position, and wherein moving the tailgate from the closed-tailgate position to the open-tailgate position moves the wiper from the first position to the second position.

* * * * *